No. 785,769. PATENTED MAR. 28, 1905.
F. P. SMITH.
APPARATUS FOR PURIFYING SEPTIC MATTER AND MANIPULATING SEWAGE.
APPLICATION FILED MAR. 21, 1904.
2 SHEETS—SHEET 1.
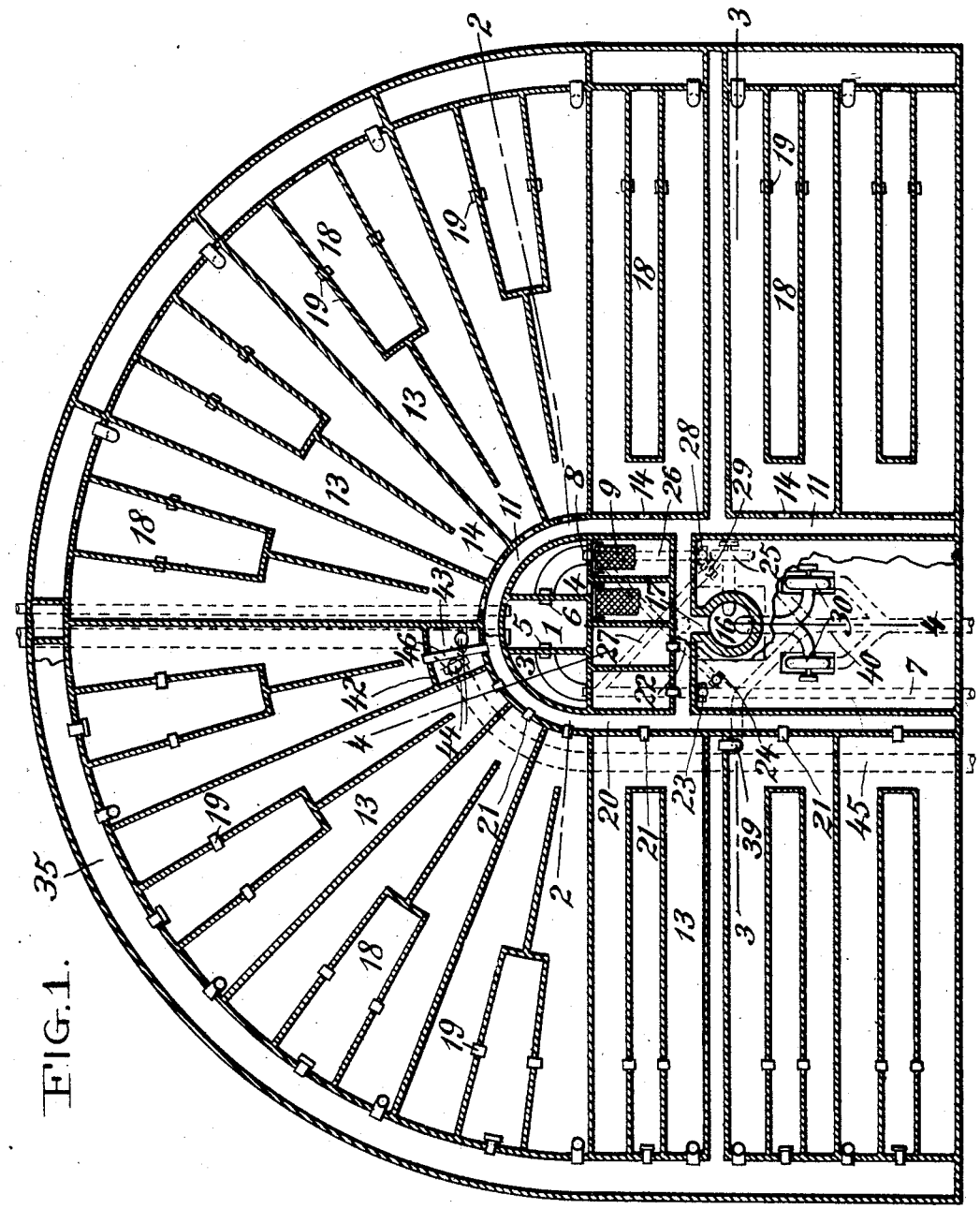

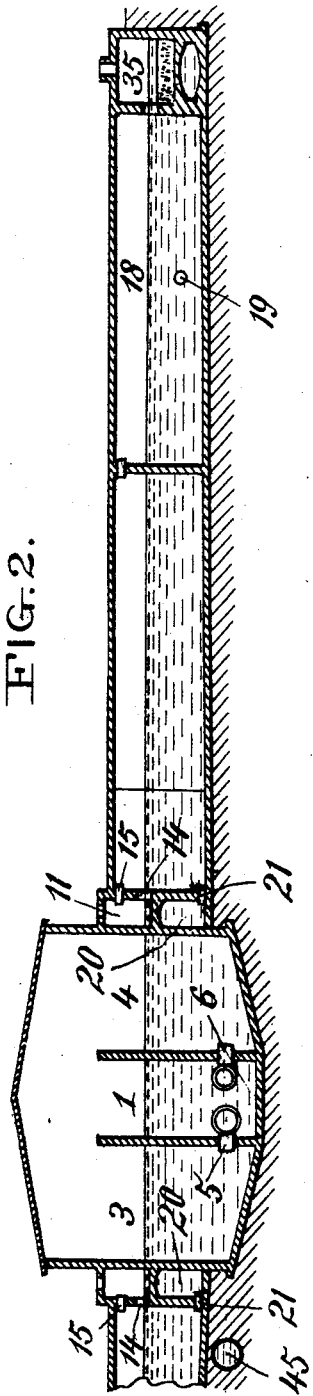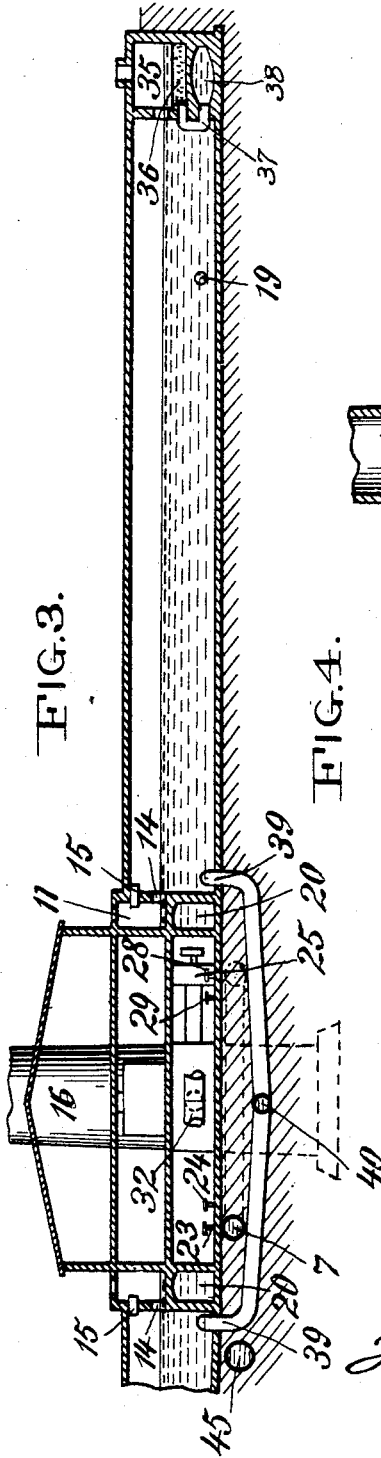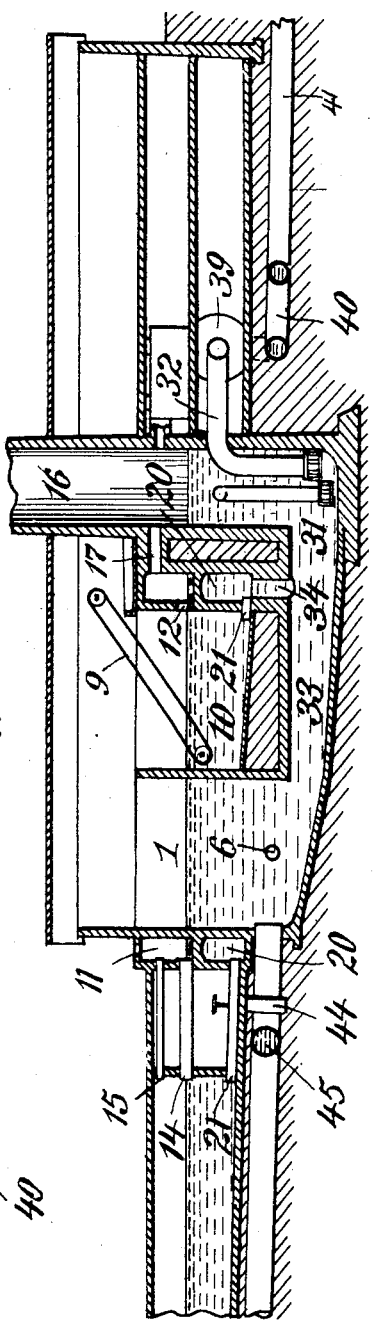

No. 785,769.

Patented March 28, 1905.

UNITED STATES PATENT OFFICE.

FRED P. SMITH, OF NEW YORK, N. Y., ASSIGNOR TO THE MUNICIPAL ENGINEERING COMPANY, OF NEW YORK, N. Y., A CORPORATION OF DELAWARE.

APPARATUS FOR PURIFYING SEPTIC MATTER AND MANIPULATING SEWAGE.

SPECIFICATION forming part of Letters Patent No. 785,769, dated March 28, 1905.

Application filed March 21, 1904. Serial No. 199,302.

*To all whom it may concern:*

Be it known that I, FRED P. SMITH, a citizen of the United States, residing at New York city, in the county and State of New York, have invented new and useful Improvements in Apparatus for Purifying Septic Matter and Manipulating Sewage, of which the following is a specification.

The object of my invention is to produce an apparatus for purifying septic matter and manipulating sewage wherein all the sewage matter is relieved of its solids and the liquid matter purified, while the gases and foul odors are collected and drawn off, and the polluted liquid of drainage is passed through the apparatus, and all arranged in a compact device easily cleansed and the storm-water prevented from accumulating therein.

The accompanying drawings illustrate the invention, of which—

Figure 1 is a horizontal section broken away, the right-hand side showing the upper part with its distributing-channel and the left-hand side the lower part with the drain-channel from the septic-tanks; Fig. 2, a vertical section taken on line 2 2 of Fig. 1; Fig 3, also a vertical section on line 3 3 of Fig. 1; Fig. 4, also a vertical section taken on line 4 4 of Fig. 1.

1 represents a well into which flows the mixed solid and liquid from a sewer or other source of supply through a pipe or conduit 2. Other wells, as 3 4, are located adjacent thereto and are provided with valved openings 5 6, through which the liquid passes into these wells. When these valves are opened, the liquid remains practically level in all. Another sewage-supply pipe, 7, discharges into wells 3 and 4. The liquid rises in the tanks and flows through an opening or openings 8 in the wall of the wells 3 and 4, falling upon the lower end of a traveling screen 9, arranged below each of the openings to receive the mixed matter. The screens carry off the more solid particles and allow the liquid and semiliquid to drop into a receptacle 10, located below the screen. Surrounding the tanks and receptacles is a channel or tunnel 11. The wall of this tunnel projects above the water-level, and as the water or liquid rises in tanks 10 it flows into the channel through the openings 12, leaving a space above the liquid therein for the collection of gases. Radiating from the channel as a central point are the septic-reservoirs 13, into which the liquid is discharged through openings 14. In these tanks the anaerobic bacteria perform their work of attacking the organic matter therein, and as the gases arise they escape back into the channel 11 through the openings 15 above the water-line, and from thence they escape or are drawn off by any suitable means for the purpose. The means shown in the drawings consist of a chimney 16, provided with an opening 17 into the channel 11. The channel is therefore a conduit for the conveyance of the liquid to the radiating septic-tanks and also a duct to carry off and convey the odors and gases escaping from the tank. Located within the septic-tanks are the vessels 18 for receiving the clarified septic liquid from the septic-tanks, which enters these vessels at a point 19 between the top and bottom of the liquid sufficiently high to escape the solid matter at the bottom and low enough to avoid the scum on the top of the liquid. Below the channel 11 is another channel, 20, which is provided with the valved openings 21 into the septic-tanks. These openings are normally closed and are opened when it is desired to clean out the septic-tanks by drawing off their contents into channel 20.

There may be any number of wells as 3 and 4 and any number of screens upon which their contents are discharged. These wells may be separately shut off from the sewage and any one or more of them cleaned out while allowing the others to continue at work.

There are times when the flow of sewage is diminished and the liquid in well 1 low enough to allow either 3 or 4 to be emptied into it. The sewer-supply pipe 7, discharging direct into tank 3, has a branch pipe 22, which discharges into well 4. The main pipe is provided with a valve 23 and the branch with a valve 24. Now to clean out 3 the valve 23 is closed, preventing the entrance of sewage, the valve 5 opened, allowing well 3 to discharge into well 1, if the liquid in well 1 is low enough, and while the cleaning is going on the sewage is entering well 4 through the branch 22. To clean out 4, the branch 22 is closed, and the well is cleaned out while the sewage is entering well 3 through the pipe 7. The pump 30 serves the purpose of draining. It is connected with pump-well 31 by the pipe 32. The drainage from the septic-tanks goes to this well from the channel 20 through the pipe 34. The drainage from the wells 1, 3, and 4 and from the septic-tanks 13 finds its way to this well 31. From well 1 extends a conduit with an inclined bottom 33, leading direct to well 31 and the sewage flows into this well as it enters from the sewer until it rises to the normal water-level. It remains in this condition, constantly receiving additional matter, which sinks to the bottom. As the liquid in this well is polluted I have made arrangements by which it may be returned to the wells 3 and 4 and passed through the septic and clarifying tanks. The pump 25 is used for this purpose. It is connected with the well 31. There are two discharge-pipes from this pump. 26 leads to well 4 and 27 to sewer-pipe 7. They are provided with valves 28 and 29. When these valves are open, the discharge from pump 25 will enter both wells 3 and 4. When 28 is closed, it will enter well 3 and when 29 is closed it will enter well 4.

The clarified-septic tanks 18, which receive the liquid from the septic-tanks 13, discharge into a series of vessels 35, arranged around the circumference or outer walls of the septic and clarifying tanks. These vessels may be designated "sludge-detectors." They are supplied at the bottom with a bed of sand or other suitable material 36, which arrests the sludge as it passes through, and the purified liquid has its outlet from these vessels through a discharge-pipe 37, connected with an effluent-conduit 38, located below the vessels. With this conduit are connected the pipes 39 and 40, which carry the liquid into the effluent drainage-pipe 41, which takes the liquid to filtering-beds or to any other point as may be desired. One of the tanks 13 is cut off at the end by a wall 42 and forms a room 43. In this room is located the valve 44 in the sewage-pipe 2, which passes through the room, by which the sewage may be turned off into pipe 45. The liquid from the channel 11 enters the tank 13 through a pipe 46, which runs through the room from the channel 11.

I have now pending in the Patent Office an application for a "Device for manipulating and disposing of sewage," filed on the 21st of March, 1904, bearing the Serial No. 199,300. Said application is partly on the lines of this and claims those features of this application which are included in the wells for receiving the crude sewage, the receptacles and the upper channels around the receptacles, the radiating septic-tanks and the openings from the septic-tanks into the channel to receive and carry off the foul odors.

What I claim is—

1. In an apparatus for purifying septic matter and manipulating sewage two or more wells for receiving sewage provided with openings for the overflow of the liquid, means for separating and carrying off the solid matter therein and a series of receptacles for receiving the liquid in combination with a channel surrounding the wells and receptacles to receive the liquid from the reservoirs a series of septic-tanks radiating from the channel to receive the liquid therefrom, means for carrying off the gases escaping from the septic-tank through the channel, a channel located below the other to receive the drainage, connected with a well, and a pump to discharge the matter from the well.

2. In an apparatus for purifying septic matter and manipulating sewage, a well to receive the sewage connected with a pump-well wherein the sewage enters and rises to the water-level, a series of wells adjacent to the receiving-well and communicating therewith, a series of communicating receptacles septic and clarifying tanks to receive the liquid from the wells, the septic tanks provided with a drain into the pump-well and a pump for discharging the liquid from the pump-well back into the receiving-well to be passed through the septic and clarifying tanks.

3. In an apparatus for purifying septic matter and manipulating sewage a series of communicating receiving-wells one of which is connected with a pump-well, and an overflow from the others into a series of receptacles, two channels located one above the other and surrounding the wells and reservoirs, the upper one to receive the liquid from the reservoirs, discharge it into a series of septic-tanks and carry off the gases arising therefrom, the lower one to receive the drainage from the septic-tanks and carry it to the pump-well in combination with a series of clarifying-tanks located within the septic-tanks, a series of vessels to receive the discharge from the clarifying-tanks, provided with a bed of suitable material to arrest the sludge, a channel located below the sludge-arresters to receive the liquid from the vessels and carry it off and a connecting-pipe from the vessels into the channel to discharge the purified liquid.

In testimony whereof I, the said FRED P. SMITH, have signed my name to this specification, in the presence of two subscribing witnesses, this 1st day of March, 1904.

FRED P. SMITH.

Witnesses:
P. J. McDONALD,
H. BROOKS PRICE.